March 9, 1948. C. L. HAHN 2,437,523
ARTIFICIAL BAIT
Filed April 26, 1944
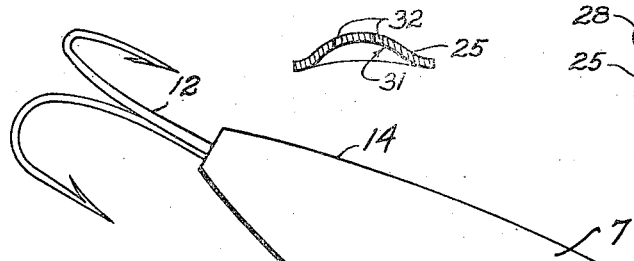
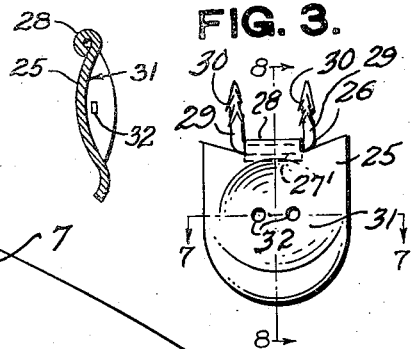
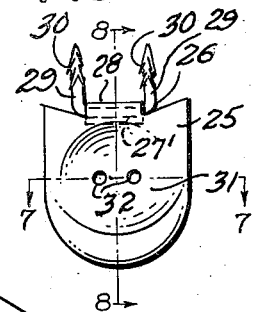
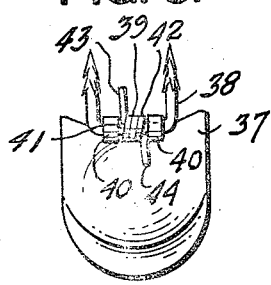
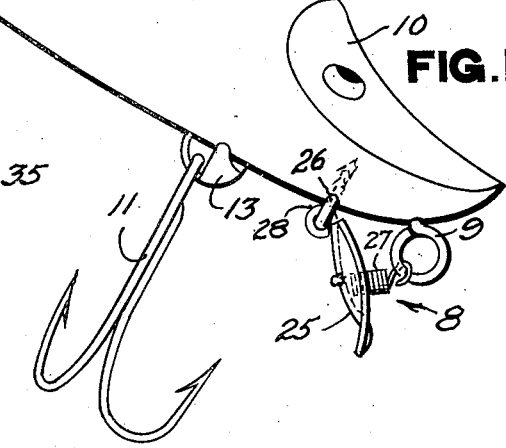
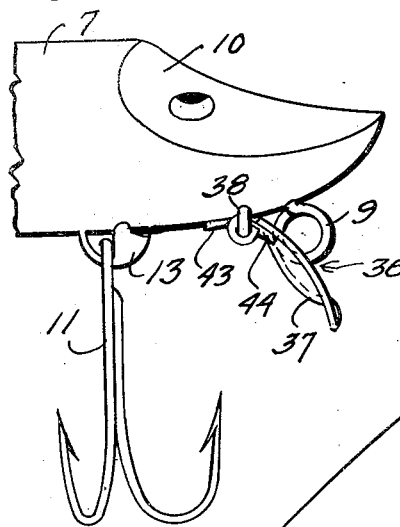
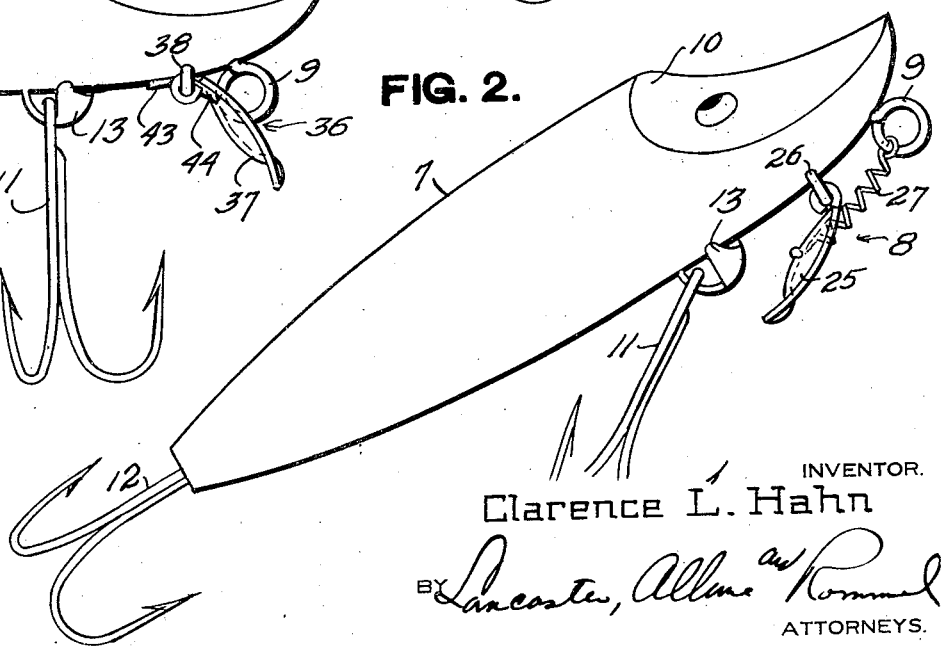
INVENTOR.
Clarence L. Hahn
BY Lancaster, Allman and Rommel
ATTORNEYS.

Patented Mar. 9, 1948

2,437,523

UNITED STATES PATENT OFFICE 2,437,523

ARTIFICIAL BAIT

Clarence L. Hahn, Baltimore, Md.

Application April 26, 1944, Serial No. 532,826

6 Claims. (Cl. 43—46)

The present invention relates to new and useful improvements in fishing tackle, and more particularly to artificial bait or fish lure.

It has been proposed in the past to provide artificial bait, of the floater type, resembling in exterior contour, in general, that of a fish, and to equip them with rigid devices, variously called "controllers," "stabilizers," "deflector plates," "spoons," etc., located in a manner to cause the bait to descend in a body of water when pull is exerted upon the forward end, as thru the fish line. Thus the antics of live bait in swimming from the surface of the water, downwardly therein may be simulated. However in order to cause the bait to again move toward the surface of the water, the pull on the fish line must be eliminated or reduced to the extent where the controller or other device is no longer effective to cause the bait to descend, and allow the bait to move upwardly, due to its buoyancy. It has been found that in doing this the artificial bait, instead of simulating the movements of live bait, in effect backs upwardly toward the water's surface thus spoiling the effect of simulating live bait. In other words, the live bait does not stop swimming to reach the surface, but rather swims to the surface with increased speed in an effort to avoid a pursuing larger fish.

The principal object of the invention is to provide artificial bait, equipped with means whereby the movements and antics of the bait, while diving into the water, while on the water and while in the water, may be controlled by simple operations of the reel or other manipulations of the line, in a manner to more accurately simulate the movements and antics of live bait.

Another object of the invention is to provide artificial bait equipped with means for causing same to resemble in its movements, the antics of live bait, some parts of which may be standard for bait used in either still water, or swift or running water, and some parts, such as springs having different degrees of resiliency selectively used either at the time of manufacture, or by the fisherman to adapt the means for use in either still water, or running water, such as swiftly running streams.

A further object of the invention is to provide means for use with artificial bait to increase its attractiveness to fish, which is low in cost of manufacture and easily applied to any of the many types of plugs or lures of the so called "floater type," or which may be incorporated as a part of the lures at the time of manufacture.

Other objects and advantages of the invention will appear in the following detailed description of the invention, taken in connection with the accompanying drawing, forming a part of this specification, and in which drawing:

Fig. 1 is a view in side elevation of a bait constructed according to the present invention and showing, by way of example, the position of the bait and parts thereof when descending in the water.

Fig. 2 is a view, in side elevation of the same, but showing, by way of example, the relative position of parts when the bait is ascending in the water.

Fig. 3 is front elevation of a portion of the means which may be attached to the bait body or plug to cause simulation of the antics of live bait.

Fig. 4 is a side elevation of another portion of said means.

Fig. 5 is a fragmentary side elevation of a modified form of the invention.

Fig. 6 is a rear elevation of a portion of the modified means which may be attached to the bait body or plug as shown in Fig. 5.

Figs. 7 and 8 are sectional views on the lines 7—7 and 8—8 of Fig. 3.

In the drawing, and referring first to the form of invention shown Figs. 1 to 4, inclusive, the artificial bait includes an elongated body or plug 7, which may be composed of wood, cork, composition or other buoyant material or of hollow metal, composition and the like, known generally as a bait of the "floater type" and means 8 carried by the body to cause it to simulate the antics of live bait upon manipulation of the line, as when casting or trolling. In the example shown this means includes a line attaching loop 9, at a head portion 10 of body 7 altho it is to be understood that the line may be connected to the body in any approved manner.

I have also shown the bait body equipped with lower and rear gang hooks 11 and 12 respectively, but this is merely by way of example. The gang hook 11 is attached to the underside of the body 7 by a combination eye and guard 13 forming no part of the present invention. The gang hook 12 is secured to a tail portion 14 of body 7 in any suitable manner.

The means 8 in the example shown in Figs. 1 to 4 inclusive comprises a controller 25, a support 26 for pivotally connecting the controller to the underside of the body 7 adjacent the head portion 10 thereof, and means 27 to yieldably and normally dispose the controller in a position extending forwardly from the underside of the body at a downward incline, as shown on Fig. 1.

The controller is preferably formed of sheet material and of spoon-like shape and is provided with a hinge barrel 28 at its upper portion.

The support 26 in the example shown is U-shaped, including a bight portion 27' serving as a pintle for the hinge barrel 28, and has its arms 29 provided with barbs 30 to anchor the support to the body 7. This is merely by way of example since there are many ways whereby the support may be connected to the body without departing from the spirit of this invention, the form shown having an advantage in that it may be applied to stock plugs or artificial bait bodies now available, as by first drilling small holes therein spaced according to the spacing of the arms 29 and then forcing the support with its controller in place.

The controller is disposed with its concave face 31 forwardly and may be provided with two perforations 32 to permit detachable connection of the means 27 thereto.

The means 27 is in the nature of a coil spring having convolutions 33 and hook terminals 34 and 35, the former being hooked to the controller thru the perforations 32, and the latter hooked to the line attaching loop 9. The convolutions 33 of the spring separate when sufficient pressure is brought upon the forward face of the controller to swing it to a position where it extends rearwardly from the underside of the body at a downward incline, as shown in Fig. 2.

As to the modified form shown in Figs. 5 and 6, means 36 is shown for a purpose like means 8. It comprises a controller 37, a support 38, and means 39 to yieldably and normally retain the controller in the position shown in Fig. 5. In this form, the controller is provided with two spaced hinge barrels 40 encircling a pintle portion 41 of the support 38 and the means 39 is in the nature of a coil spring 42 provided with terminal arms 43 and 44, the convolutions of the spring being located between the hinge barrels 40, surrounding the pintle portion 41; the arm 43 engaging the underside of body 7; and the arm 44 engaging the back of the controller 37. When attaching the means 36 to the body 7, the spring 42 is placed under tension so as to normally swing the controller to a position where it extends forwardly from the underside of the body at a downward incline, being limited, in the example shown, in its forward movement, by the line attaching loop 9.

The form of invention shown in Figs. 1 to 4 inclusive permits the selection and attachment of a spring of a size or strength to meet the particular conditions where the artificial bait is used, and to readily change to the use of a different spring of a size or strength to meet changed conditions. For instance a stronger spring may be used where more swift or rough water is encountered than in still water, and thereby the controller will not act too freely when encountering strong currents. This form of invention also permits ready replacement of broken or damaged springs. The determination of the size of the spring is well within the skill of those versed in the art.

The operation of the means 8 and 36 will no doubt be readily understood to those skilled in the art, however it is pointed out that several of the movements and antics of live bait may be simulated by their use. Upon reeling in the fish line slowly, the bait will travel in a zig-zag course on the surface of the water. By a moderate pull transmitted thru the line to the attaching loop 9 the controller digs into the water, so to speak, and the bait descends into the water as if swimming toward the bottom. When the desired depth is reached, the pressure of the water is, of course increased over pressure adjacent the surface. This increased pressure and increased pull transmitted by the line to the attaching loop 9 will exert sufficient pressure on the controller to trip it back to a position like that shown in Fig. 2 and the bait will ascend in the water simulating live bait swimming toward the surface. Upon reaching the surface it jumps out of the water and again descends upon the water, with a splash. While in the air, pressure of the water on the controller is released and it quickly moves to a normal position in readiness for surface movement or another dive according to the characteristic of the pull transmitted to the body 7 at the attaching loop 9.

I claim:

1. An artificial bait comprising, a body including a head portion and a tail portion, a controller hingedly carried by said body at its underside adjacent said head portion, and means to yieldably dispose said controller in a position extending forwardly from the underside of the body at a downward incline and permit it to swing to a position extending rearwardly from the underside of the body at a downward incline responsive to pressure exerted upon the forward face of the controller.

2. An artificial bait comprising, a body including a head portion and a tail portion, a controller hingedly carried by said body at its underside adjacent said head portion, and spring means to yieldably dispose said controller in a position extending forwardly from the underside of the body at a downward incline and permit it to swing to a position extending rearwardly from the underside of the body at a downward incline responsive to pressure exerted upon the forward face of the controller.

3. An artificial bait comprising, a body including a head portion and a tail portion, a spoon-like controller pendently carried by said body at its underside, adjacent said head portion and disposed with its concave face forwardly, and means to yieldably and normally dispose said controller in a position extending forwardly from the underside of the body at a downward incline and permit it to swing to a position extending rearwardly from the underside of the body at a downward incline responsive to pressure exerted upon the forward face of the controller.

4. An artificial bait comprising, a body including a head portion and a tail portion, a controller pendently carried by said body at its underside adjacent said head portion, and a coil spring detachably connected to said controller and body, and located to normally dispose the controller in a position extending forwardly from the underside of the body at a downward incline, and yieldable to permit the controller to swing to a position extending rearwardly from the underside of the body at a downward incline.

5. An artificial bait comprising a body including a head portion and a tail portion, a controller, a support carried by the body, including a pintle portion extending crosswise beneath the underside thereof, hingedly supporting said controller, and a coil spring, provided with terminal arms, located with its convolutions surrounding said pintle portion and its terminal arms acting upon said body and controller to normally dispose the controller in a position extending forwardly from the underside of the body at a downward incline, and yieldable to permit the controller to swing to a position extending rearwardly from the underside of the body at a downward incline.

6. An artificial bait comprising, a body including a head portion and a tail portion, and a spoon-like controller means carried by said body and including a part normally, in a first position, extending downwardly and forwardly beneath the body to cause the same to descend in the water upon moderate pull transmitted to the head portion of the body; said part movable to a second position extending downwardly and rearwardly beneath the body responsive to pressure forwardly upon the controller means upon increased pull transmitted to the head portion of the body, to cause the body to ascend in the water during continuation of said increased pull; and said part movable to said first position upon release of the increased pull.

CLARENCE L. HAHN.

REFERENCES CITED

The following references are of record in the file of this patent:

UNITED STATES PATENTS

| Number | Name | Date |
|---|---|---|
| 2,179,641 | Layfield | Nov. 14, 1939 |
| 1,440,869 | Foss | Jan. 2, 1923 |
| 1,423,025 | Rodgers et al. | July 18, 1922 |